United States Patent
Kang et al.

(10) Patent No.: US 9,776,879 B2
(45) Date of Patent: Oct. 3, 2017

(54) SURFACE-TREATMENT METHOD OF CATHODE ACTIVE MATERIAL AND CATHODE ACTIVE MATERIAL FORMED THEREFROM

(71) Applicant: LG Chem, Ltd., Seoul (KR)

(72) Inventors: Sung-Joong Kang, Daejeon (KR); Hong-Kyu Park, Daejeon (KR); Joo-Hong Jin, Daejeon (KR); Dae-Jin Lee, Daejeon (KR)

(73) Assignee: LG Chem, Ltd. (KR)

( * ) Notice: Subject to any disclaimer, the term of this patent is extended or adjusted under 35 U.S.C. 154(b) by 753 days.

(21) Appl. No.: 14/050,990

(22) Filed: Oct. 10, 2013

(65) Prior Publication Data

US 2014/0050656 A1 Feb. 20, 2014

Related U.S. Application Data

(63) Continuation of application No. PCT/KR2012/003502, filed on May 3, 2012.

(30) Foreign Application Priority Data

May 3, 2011 (KR) .................. 10-2011-0042034
Apr. 26, 2012 (KR) .................. 10-2012-0043934

(51) Int. Cl.
*H01M 4/505* (2010.01)
*H01M 4/525* (2010.01)
(Continued)

(52) U.S. Cl.
CPC ............ *C01D 15/02* (2013.01); *H01M 4/485* (2013.01); *H01M 4/505* (2013.01); *H01M 4/525* (2013.01); *H01M 4/5825* (2013.01)
(Continued)

(58) Field of Classification Search
CPC ..................................................... H01M 4/505
See application file for complete search history.

(56) References Cited

U.S. PATENT DOCUMENTS 5,916,516 A   6/1999  Kolb
5,968,683 A * 10/1999  Kolb .................. C01G 45/1242
                                                  429/218.1
(Continued)

FOREIGN PATENT DOCUMENTS

CN      101147283 A      3/2008
CN      101276911 A     10/2008
(Continued)

OTHER PUBLICATIONS

Wang D, et al., "New solid-state synthesis routine and mchanism for LiFePO4 using LiF as lithium precursor." Journal of Sold State Chemistry, Orlando, FL, US, vol. 177, No. 12, Dec. 1, 2004 (Dec. 1, 2004), pp. 4582-4587.

(Continued)

*Primary Examiner* — Ula C Ruddock
*Assistant Examiner* — Gregory Passa
(74) *Attorney, Agent, or Firm* — Lerner, David, Littenberg, Krumholz & Mentlik, LLP

(57) ABSTRACT

The present invention provides a method for treating the particle surface of a cathode active material for a lithium secondary battery, the method comprising (a) preparing a cathode active material having a lithium compound; (b) generating a plasma from a gas comprising at least one of a fluorine-containing gas and a phosphorus-containing gas as a part of a reactive gas; and (c) removing lithium impurities present on the particle surface of the cathode active material with the plasma. In accordance with the present invention, the amount of the lithium impurities present on the particle surface of the cathode active material can be reduced to (Continued)

suppress a side reaction of the lithium impurities and an electrolyte.

10 Claims, 4 Drawing Sheets

(51) Int. Cl.
  *H01M 4/485* (2010.01)
  *H01M 4/58* (2010.01)
  *C01D 15/02* (2006.01)

(56) References Cited

U.S. PATENT DOCUMENTS

| | | | |
|---|---|---|---|
| 6,458,488 B1* | 10/2002 | Honbo | H01M 4/131 429/209 |
| 7,648,693 B2* | 1/2010 | Paulsen | C01G 53/006 423/594.15 |
| 2006/0154147 A1 | 7/2006 | Kurihara et al. | |
| 2008/0254368 A1 | 10/2008 | Ooyama et al. | |
| 2008/0318126 A1* | 12/2008 | Ishii | H01M 4/136 429/223 |
| 2009/0226810 A1 | 9/2009 | Paulsen et al. | |
| 2009/0278082 A1 | 11/2009 | Takebayashi et al. | |
| 2009/0286157 A1 | 11/2009 | Chen et al. | |
| 2010/0270517 A1* | 10/2010 | Hong | C08J 3/212 252/519.33 |
| 2010/0304146 A1 | 12/2010 | Krebs et al. | |
| 2012/0129051 A1 | 5/2012 | Wang et al. | |

FOREIGN PATENT DOCUMENTS

| | | |
|---|---|---|
| JP | H06-168715 A | 6/1994 |
| JP | 09180721 | 7/1997 |
| JP | 10284079 | 10/1998 |
| JP | 11317217 | 11/1999 |
| JP | 2003-002661 A | 1/2003 |
| JP | 2004-164934 A | 6/2004 |
| JP | 2005-026012 A | 1/2005 |
| JP | 2010092835 A | 4/2010 |
| KR | 2013-0087214 A | 8/2013 |
| WO | 2010/105917 A1 | 9/2010 |

OTHER PUBLICATIONS

International Search Report for Application No. PCT/KR2012/003502 dated Nov. 5, 2012.

* cited by examiner

SURFACE-TREATMENT METHOD OF CATHODE ACTIVE MATERIAL AND CATHODE ACTIVE MATERIAL FORMED THEREFROM

CROSS-REFERENCE TO RELATED APPLICATION(S)

This application is a continuation of International Application No. PCT/KR2012/003502 filed on May 3, 2012, which claims priority to Korean Patent Application Nos. 10-2011-0042034 and 10-2012-0043934 filed in the Republic of Korea on May 3, 2011 and Apr. 26, 2012, respectively, the disclosure of which are incorporated herein by reference.

TECHNICAL FIELD

The present invention relates to a surface-treatment method of cathode active material and a cathode active material formed therefrom, and more particularly to a method for treating the particle surface of cathode active material for a secondary battery with a plasma generated by gases and a cathode active material formed therefrom.

BACKGROUND ART

A cathode active material for a secondary battery has lithium impurities such as LiOH and $LiCO_3$ which are present on the particle surface thereof. If these impurities are present in an excessive amount, not only do they cause to make an electrode slurry to be gelated during the production of the electrode slurry in the preparation of an electrode of a lithium secondary battery, but also causes a swelling phenomenon, particularly a lithium ion prismatic or polymer battery expanding, when reacted with the components of an electrolyte introduced in the lithium secondary battery.

Accordingly, there is a need for minimizing the content of lithium impurities present on the particle surface of the cathode active material for a lithium secondary battery.

DISCLOSURE

Technical Problem

The present invention is designed to solve the problems described above, therefore, it is an object of the present invention to improve the properties of a cathode active material for a lithium secondary battery by removing lithium impurities present on the particle surface thereof.

Technical Solution

In order to achieve the object, the present invention provides a method for treating the particle surface of a cathode active material for a lithium secondary battery, the method comprising (a) preparing a cathode active material having a lithium compound; (b) generating a plasma from gases comprising at least one of a fluorine-containing gas and a phosphorus-containing gas as a part of a reactive gas; and (c) removing lithium impurities present on the particle surface of the cathode active material by contact and reaction with the plasma.

In the present invention, the lithium compound may be selected from the group consisting of $LiCoO_2$, $LiNiO_2$, $LiMn_2O_4$, $LiFePO_4$, $LiFe_{1-x}Mn_xPO_4$, $LiNi_{1-x}Mn_xCo_yO_2$ ($0 \leq x \leq 1$, $0 \leq y \leq 1$) and $LiNi_{1-x-y-z}Co_xM1_yM2_zO_2$ (wherein, M1 and M2 are each independently selected from the group consisting of Al, Ni, Co, Fe, Mn, V, Cr, Ti, W, Ta, Ma and Mo; and x, y and z are each independently an atomic fraction of oxide-forming elements, in which $0 \leq x \leq 1$, $0 \leq y \leq 1$, and $0 \leq z \leq 1$).

The reactive gas may further comprise at least one selected from hydrogen, oxygen, hydrocarbon and a compound containing other halogen family elements, as well as the fluorine-containing gas and the phosphorus-containing gas.

The fluorine-containing gas may be $SF_6$.

The phosphorus-containing gas may comprise at least one selected from $PH_3$, $P(CH_3)_3$ and $PF_3$.

The hydrocarbon may be at least one selected from $CH_4$ or $C_2H_2$.

In the present invention, the gases used for generating the plasma may further comprise a carrier gas comprising an inert gas, as well as the reactive gas.

The carrier gas may comprise at least one selected from nitrogen, argon, helium and neon.

The reactive gas may comprise $SF_6$ and $CH_4$, and the carrier gas may comprise $N_2$.

The lithium impurities may comprise LiOH or $Li_2CO_3$.

The step (b) may be conducted by using a capacitively-coupled plasma (CCP) generator, an inductively-coupled plasma (ICP) generator, a direct current (DC) plasma generator or a dielectric barrier discharge (DBD) plasma generator.

The step (c) may comprise modifying at least part of the lithium impurities to LiF.

The step (c) may further comprise sputtering at least part of the lithium impurities with the accelerated ions of the plasma by reaction with plasma ions.

In order to accomplish the above object, a cathode active material according to the present invention is prepared by the surface treatment method mentioned above.

Meanwhile, the cathode active material of the present invention comprises lithium compounds having lithium impurities including LiOH and $Li_2CO_3$ on the particle surface of the cathode active surface in an amount less than 0.3 wt % relative to total weight of the cathode active material particles.

Advantageous Effects

In accordance with one aspect of the present invention, plasma ions generated in a plasma generator react with lithium impurities present on the particle surface of a cathode active material to modify the lithium impurities to other materials which do not react with an electrode, thereby suppressing a side reaction of the lithium impurities and the electrolyte.

In accordance with another aspect of the present invention, the plasma ions which are generated and accelerated in the plasma generator eliminate the modified lithium impurities and the remaining lithium impurities from the particle surface of the cathode active material to suppress a side reaction of the lithium impurities and the electrolyte.

DESCRIPTION OF THE DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

BEST MODE

Hereinafter, preferred embodiments of the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Accordingly, the configurations illustrated in the embodiments and the drawings are just preferable examples for the purpose of illustrations only, not intended to limit the scope of the disclosure, so it should be understood that other equivalents and modifications could be made thereto without departing from the spirit and scope of the disclosure.

Figure 1:
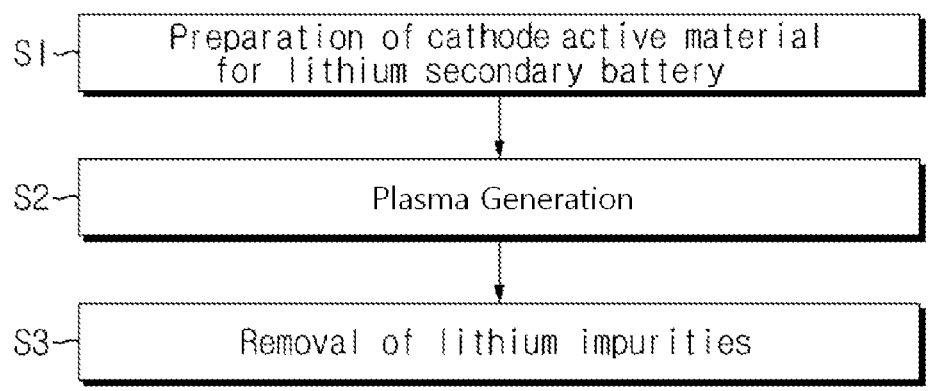
FIG. 1 is a flow chart showing a method for treating the particle surface of a cathode active material according to the present invention.

FIG. 1 is a flow chart showing a method for treating the particle surface of a cathode active material.

Referring to FIG. 1, the method for treating the particle surface of a cathode active material according to the present invention comprises the preparation of a cathode active material for a lithium secondary battery (S1), the generation of plasma (S2), and the removal of lithium impurities (S3).

The step S1 is to prepare a cathode active material for a lithium secondary battery, intended for plasma-treatment. The cathode active material used in the present invention may include any cathode active material which is known to be used in conventional secondary batteries, and the non-limiting examples of the cathode active material may include lithium-manganese oxides, lithium-cobalt oxides, lithium-nickel oxides, lithium-iron oxides and lithium composite oxides obtained from these combinations, more specifically, may be selected from the group consisting of $LiCoO_2$, $LiNiO_2$, $LiMn_2O_4$, $LiFePO_4$, $LiFe_{1-x}Mn_xPO_4$, $LiNi_{1-x-y}Mn_xCo_yO_2$ (0≤x≤1, 0≤y≤1) and $LiNi_{1-x-y}Co_xM1_yM2zO_2$ (wherein, M1 and M2 are each independently selected from the group consisting of Al, Ni, Co, Fe, Mn, V, Cr, Ti, W, Ta, Ma and Mo; and x, y and z are each independently an atomic fraction of oxide-forming elements, in which 0=x<1, 0=y<1, and 0=z<1).

The step S2 is to generate a plasma for treating the particle surface of the cathode active material prepared in the step S1. The plasma may be generated by using a reactive gas comprising at least one selected from hydrogen, oxygen, a halogen family element-containing compound, a phosphorus-containing compound and hydrocarbon. The reaction gas may be used together with a carrier gas comprising at least one inert gas such as nitrogen, argon, helium and neon.

Specifically, the halogen family element-containing compound may be a fluorine-containing gas such as $SF_6$. Exemplary phosphorus-containing gases may include at least one selected from $PH_3$, $P(CH_3)_3$ and $PF_3$.

A plasma generator used in the generation of the plasma is not particularly limited, and may include, for example, a capacitively-coupled plasma (CCP) generator, an inductively-coupled plasma (ICP) generator, a DC plasma generator or a dielectric barrier discharge (DBD) plasma generator.

The step S3 is to surface-treat the particles of the cathode active material prepared in the step S1 with the plasma generated in the step S2 to remove lithium impurities present on the particle surface of the cathode active material.

Figure 2:
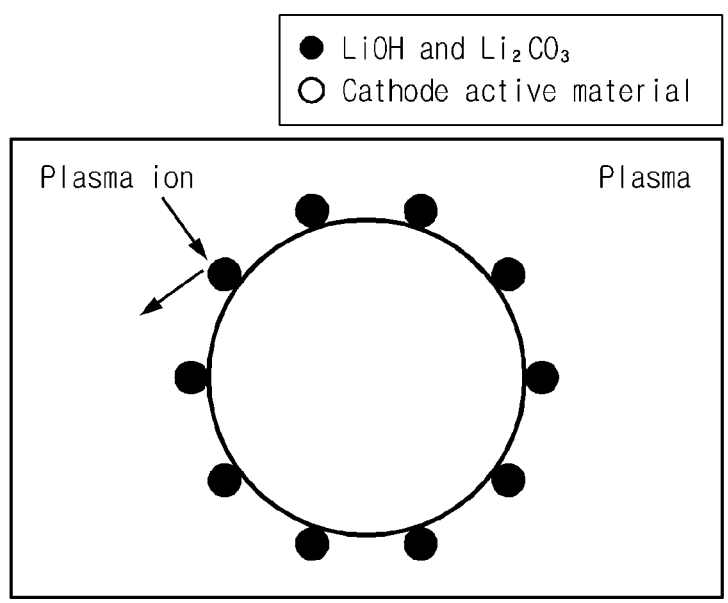
FIG. 2 schematically shows the attack of ions generated in a plasma generator to lithium impurities present on the particle surface of a cathode active material.

As shown in FIG. 2, lithium impurities such as LiOH or $Li_2CO_3$ are present on the particle surface of the cathode active material and react with the plasma ions generated in the plasma generator to modify the lithium impurities to other materials which do not react with an electrode, thereby removing the lithium impurities. In addition, the modified lithium impurities and the remaining lithium impurities may be removed from the particle surface of the cathode active material by sputtering with the plasma ions which are generated and accelerated in the plasma.

A cathode active material prepared by the surface treatment method according to the present invention preferably has lithium impurities such as LiOH and $Li_2CO_3$ on the particle surface thereof in an amount less than 0.3 wt % relative to the total weight of the cathode active material particles. If the lithium impurities are present in an amount of 0.3 wt % or more on the particle surface of the cathode active material, an excessive swelling phenomenon occurs due to the high reactivity of the lithium impurities for an electrolyte.

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

Example 1

A 3-membered (Ni/Mn/Co) cathode active material having a composition of $Li(Ni_{0.8}Mn_{0.1}Co_{0.1})O_2$ was used for plasma-treatment. Since the cathode active material having a composition of $Li(Ni_{0.8}Mn_{0.1}Co_{0.1})O_2$ has a high content of Ni to provide large capacity, whereas the presence of excessive lithium impurities on the surface thereof causes high reactivity with an electrolyte. Accordingly, this may increase the swelling phenomenon of a battery cell, which may remarkably be exhibited at high temperatures. In order to prevent such a swelling phenomenon, the particle surface of the cathode active material having a composition of $Li(Ni_{0.8}Mn_{0.1}Co_{0.1})O_2$ was plasma-treated by using a capacitively-coupled plasma (CCP) generator under the conditions as follows.

$N_2/SF_6/CH_4$ (Molecular weight—100:10:1) atmosphere

Atmospheric pressure

Power for maintaining plasma: 500 W

Applied frequency: 1 kHz~2.5 GHz

After the plasma-treatment, the amount of impurities remaining on the surface of the cathode active material was calculated by a HCl-titration according to the method disclosed in US2009/0226810A1. Explanation for the specific titration method is omitted herein.

Figure 3A:
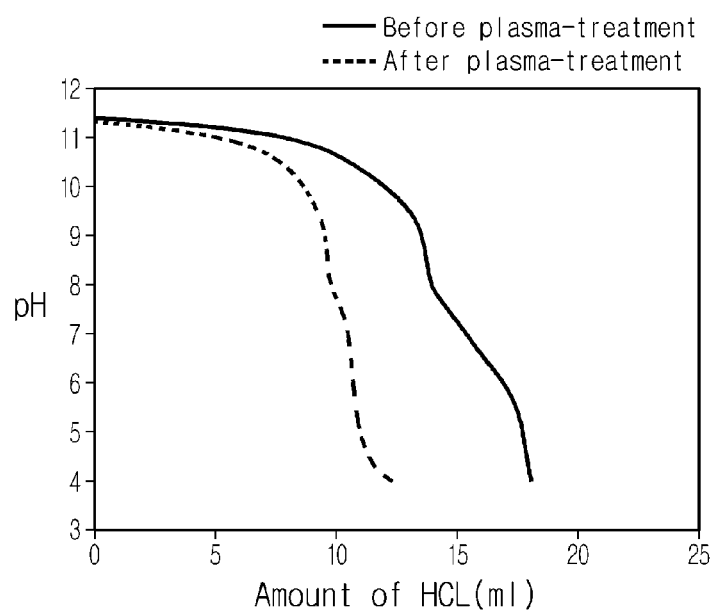
FIG. 3a is an HCl-titration graph (pH of 4 or higher) for the particle surface of a cathode active material according to Example 1 of the present invention.

As shown in FIG. 3a, the amount of HCl used in the HCl-titration up to pH 4 after the plasma-treatment is less than that before the plasma-treatment, which means the lithium impurities, such as LiOH and LiCO$_3$, excessively present on the surface of the cathode active material before the plasma-treatment is reduced after the plasma-treatment.

Figure 3B:
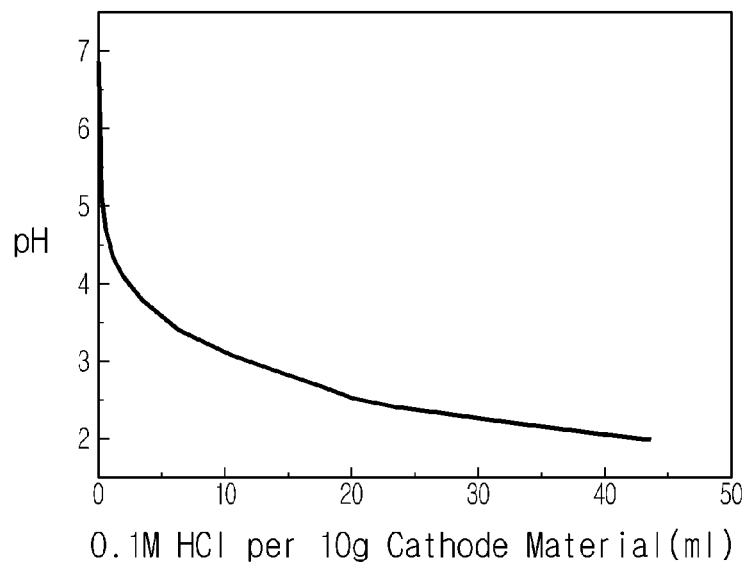
FIG. 3b is an HCl-titration graph (pH of 5 or less) for the particle surface of a cathode active material which is surface-treated according to Example 1 of the present invention.
Figure 4A:
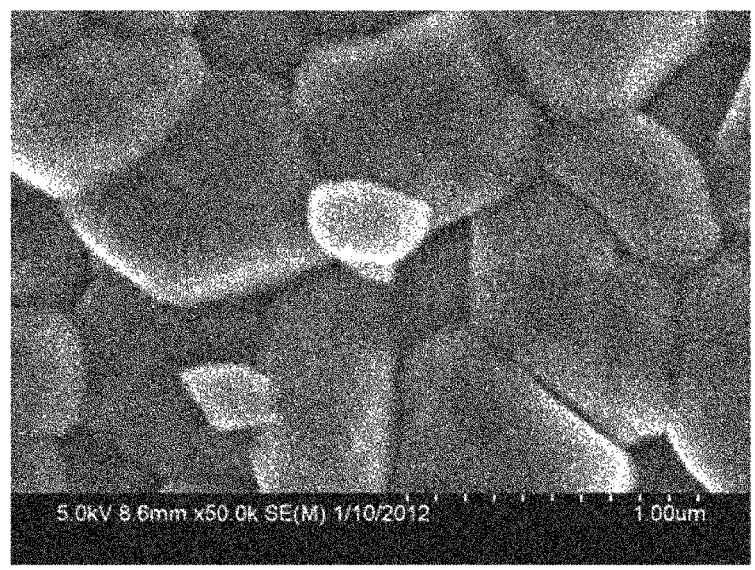
FIG. 4a is a photograph for the particle surface of a cathode active material before plasma-treatment.
Figure 4B:
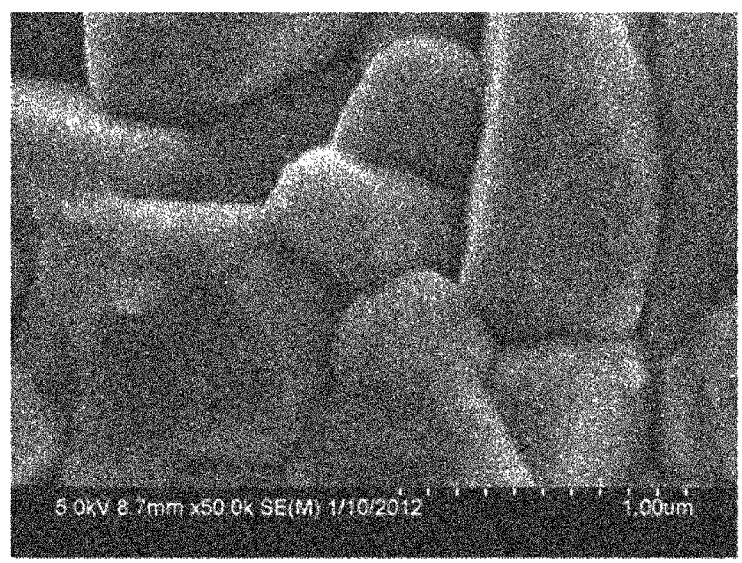
FIG. 4b is a photograph for the particle surface of a cathode active material after plasma-treatment.

FIG. 3b shows a HCl-titration curve at a pH of 5 or less after the plasma-treatment, which is consistent with the HCl-titration curve of LiF. From this, it can be confirmed that LiF is newly generated by the plasma-treatment. FIGS. 4a and 4b are photographs showing the particle surface of the cathode active material before and after the plasma-treatment, respectively.

Meanwhile, each amount of the lithium impurities before and after the plasma-treatment was calculated and listed in Table 1 below.

TABLE 1

|  | Before the plasma-treatment | After the plasma-treatment |
|---|---|---|
| LiOH (wt %) | 0.233 | 0.196 |
| LiCO$_3$ (wt %) | 0.296 | 0.103 |
| Total (wt %) | 0.529 | 0.299 |

* wt %: the weight of lithium impurities relative to the total weight of cathode active material particles As shown in Table 1, the amount of the lithium impurities present on the particle surface of the cathode active material is reduced by about 44% after the plasma-treatment, compared with that before the plasma-treatment.

Example 2

The procedure of Example 1 was repeated except that a 3-membered (Ni/Mn/Co) cathode active material having a composition of Li(Ni$_{0.6}$Mn$_{0.2}$Co$_{0.2}$)O$_2$ was used for plasma-treatment by means of a CCP generator, so as to reduce lithium impurities on the surface of a cathode active material, thereby alleviating the swelling phenomenon of a battery cell.

Figure 5:
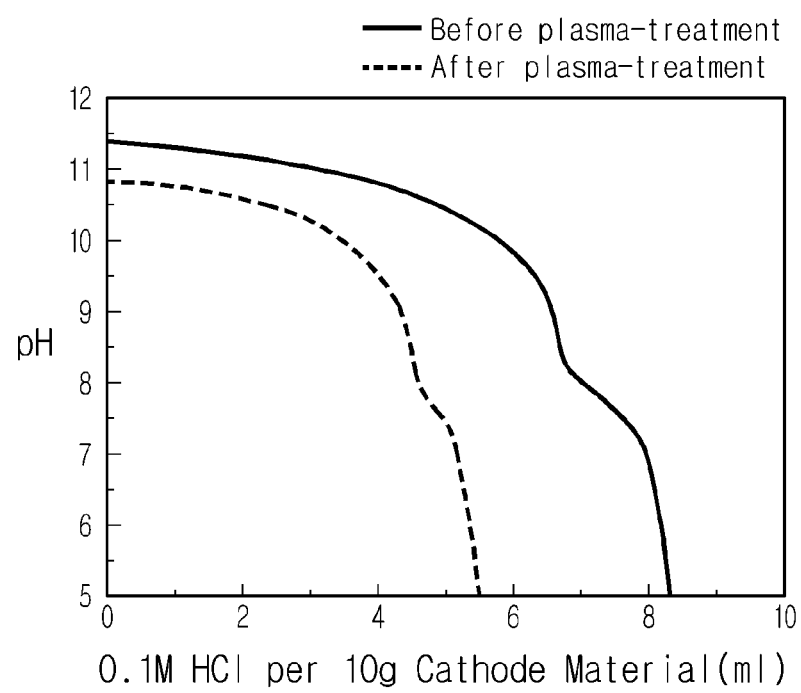
FIG. 5 is an HCl-titration graph (pH of 5 or higher) for the particle surface of a cathode active material according to Example 2 of the present invention.

As shown in FIG. 5, the amount of HCl used in a HCl-titration after the plasma-treatment is less than that before the plasma-treatment, which means the lithium impurities, such as LiOH and LiCO$_3$, excessively present on the surface of the cathode active material before the plasma-treatment is reduced after the plasma-treatment, similar to the results in Example 1.

Meanwhile, each amount of the lithium impurities before and after the plasma-treatment was calculated and listed in Table 2 below.

TABLE 2

|  | Before the plasma-treatment | After the plasma-treatment |
|---|---|---|
| LiOH (wt %) | 0.119 | 0.087 |
| LiCO$_3$ (wt %) | 0.125 | 0.069 |
| Total (wt %) | 0.244 | 0.156 |

* wt %: the weight of lithium impurities relative to the total weight of cathode active material particles As shown in Table 2, the amount of the lithium impurities present on the particle surface of the cathode active material is reduced by about 36% after the plasma-treatment, compared with that before the plasma-treatment.

As mentioned above, in accordance with the inventive method for treating the particle surface of a cathode active material, lithium impurities present on the particle surface of the cathode active material can be reduced to alleviate the swelling phenomenon of a battery cell using the cathode active material.

INDUSTRIAL APPLICABILITY

The present invention has been described with reference to the specific examples and drawings, however, is not limited thereto, and so it should be understood that various modifications and changes may be made by those having ordinary skill in the art without departing from the technology of the present invention and the spirit and scope of the following claims.

What is claimed is:

1. A method for treating particle surface of a cathode active material for a lithium secondary battery, the method comprising:
   (a) preparing a cathode active material comprising a lithium compound;
   (b) generating a plasma from gases comprising at least one of a fluorine-containing gas and a phosphorus-containing gas as a part of a reactive gas; and
   (c) removing lithium impurities present on particle surface of the cathode active material with the plasma,
   wherein the reactive gas comprises SF$_6$,
   wherein the gases further comprise a carrier gas comprising an inert gas, and
   wherein the lithium impurities comprise at least one of LiOH and Li$_2$CO$_3$.

2. The method for treating particle surface of a cathode active material according to claim 1, wherein the lithium compound is selected from the group consisting of LiCoO$_2$, LiNiO$_2$, LiMn$_2$O$_4$, LiFePO$_4$, LiFe$_{1-x}$Mn$_x$PO$_4$, LiNi$_{1-x-y}$Mn$_x$Co$_y$O$_2$ (0≤x<1, 0≤y<1) and LiNi$_{1-x-y-z}$Co$_x$M1$_y$M2$_z$O$_2$ (wherein, M1 and M2 are each independently selected from the group consisting of Al, Ni, Co, Fe, Mn, V, Cr, Ti, W, Ta, Ma and Mo; and x, y and z are each independently an atomic fraction of oxide-forming elements, in which 0≤x<1, 0≤y<1, and 0≤z<1).

3. The method for treating particle surface of a cathode active material according to claim 1, wherein the reactive gas further comprises at least one selected from hydrogen, oxygen, hydrocarbon and a compound containing halogen family elements.

4. The method for treating particle surface of a cathode active material according to claim 1, wherein the phosphorus-containing gas comprises at least one selected from PH$_3$, P(CH$_3$)$_3$ and PF$_3$.

5. The method for treating particle surface of a cathode active material according to claim 3, wherein the hydrocarbon is CH$_4$.

6. The method for treating particle surface of a cathode active material according to claim 1, wherein the inert gas is at least one selected from nitrogen, argon, helium and neon.

7. The method for treating particle surface of a cathode active material according to claim 1, wherein the reactive gas further comprises CH$_4$, and the inert gas is N$_2$.

8. The method for treating particle surface of a cathode active material according to claim 1, wherein the step (b) is conducted by using a capacitively-coupled plasma (CCP) generator, an inductively-coupled plasma (ICP) generator, a direct current (DC) plasma generator or a dielectric barrier discharge (DBD) plasma generator.

9. The method for treating particle surface of a cathode active material according to claim 1, wherein the step (c) comprises modifying at least part of the lithium impurities to LiF.

10. The method for treating particle surface of a cathode active material according to claim 9, wherein the step (c) further comprises sputtering at least part of the lithium impurities with the accelerated ions of the plasma.

* * * * *